Oct. 13, 1970  H. M. REINIGER  3,533,906
PERMANENTLY REACTED LIGNOCELLULOSE PRODUCTS
AND PROCESS FOR MAKING THE SAME
Filed Oct. 11, 1967  5 Sheets-Sheet 3

INVENTOR
HAIGH M. REINIGER

Oct. 13, 1970     H. M. REINIGER     3,533,906
PERMANENTLY REACTED LIGNOCELLULOSE PRODUCTS
AND PROCESS FOR MAKING THE SAME
Filed Oct. 11, 1967     5 Sheets-Sheet 4

INVENTOR
HAIGH M. REINIGER

Oct. 13, 1970  H. M. REINIGER  3,533,906
PERMANENTLY REACTED LIGNOCELLULOSE PRODUCTS
AND PROCESS FOR MAKING THE SAME
Filed Oct. 11, 1967  5 Sheets-Sheet 5

INVENTOR.
Haigh M. Reiniger

United States Patent Office 3,533,906
Patented Oct. 13, 1970

3,533,906
PERMANENTLY REACTED LIGNOCELLULOSE
PRODUCTS AND PROCESS FOR MAKING THE
SAME
Haigh M. Reiniger, Contentment Island,
Darien, Conn. 06820
Continuation-in-part of applications Ser. No. 422,270,
Dec. 30, 1964, and Ser. No. 518,248, Jan. 3, 1967.
This application Oct. 11, 1967, Ser. No. 676,996
Int. Cl. D21b 1/34
U.S. Cl. 162—13                                     7 Claims

ABSTRACT OF THE DISCLOSURE

There are provided products and process for making the same wherein lignocellulose materials are soaked and subjected to a quick acting compression force of 500 to 10,000 p.s.i. to force the liquids of the materials into a microstructure of the lignocellulose materials causing collapse of the cellular structure, such that the microstructure of the cell walls are fissured and ruptured. The so treated materials are cooked under a pressure of 130 p.s.i. to 650 p.s.i. such that no more than 15% of the natural lignons in the lignocellulose materials are lost. The materials are then refined to effect fiber separation. The materials then may be shaped into any desired cellulose article and the lignins activated under elevated pressures and temperatures to form a permanently reacted lignocellulose shape held together by the permanently reacted natural lignins of the lignocellulose material.

This application is a continuation-in-part of my copending applications Ser. No. 422,270, filed Dec. 30, 1964, now abandoned, and Ser. No. 518,248, filed Jan. 3, 1967, now abandoned.

The present invention relates to products made of cellulose pulp such as papers, molded products and pulp boards. The invention is particularly applicable to boards made from cellulosic vegetable fibers of wood, sawdust, or wood chips such as waste hardwoods, pine, fir, oak, sugar cane, cotton stem, etc., optionally in combination with supplementary fillers and binders, including chemicals or synthetic additives. Other cellulosic fibers which may be adapted to the new products and manufacturing process are derived from primary or waste process of straw, flax, kenaf, ramie, coir, jute, and other vegetable fibers, stems or stalks.

While the present invention is equally applicable to any shaped pulp product such as paper, molded, extruded, vacuum formed or pressed products, the invention has particular utility in connection with pulp boards, and for the sake of simplicity, the invention will be described in detail in connection therewith. It is to be clearly understood, however, that the invention is not limited to pulp boards.

Various types of pulp products such as pressed boards are well known, e.g., those made from various wood fibers, flakes, particles and chips. Such pulp boards are commonly referred to as hardboards, chipboards, and insulation boards. None of these products are identical and there is a wide variation in the physical and mechanical properties of each category; their application generally serves a particular purpose; while there is some over-lap, all are not suitable for the same purpose, and each has distinct characteristics.

It is an object of the present invention to produce products such as papers, molded and extruded products and pressed boards. It is a further object to produce pressed boards by a thoroughly controlled process which avoids the drawbacks and disadvantages of both the conventional wet process and the more expensive dry glue-board process.

It is another object of the present invention to manufacture products such as pressed boards from woodchips such as from kiln-dried waste oak and other hardwoods, soft woods and other green vegetable fibers, or from the blends of these, where the process waste from these materials may be recovered and re-cycled in the same system.

It is yet another object to use sugar-cane fiber pulp, called bagasse, for making novel pressed boards according to this invention, as well as wood cellulose fibers. The former is an inexpensive and easily obtained cellulosic fiber waste by-product of raw sugar crushing and milling, and it has been utilized for many years in the manufacture of wet-process soft insulation and acoustical boards. However, the present invention is not limited to any particular cellulosic vegetable fiber and the inventive process can be practiced by using any natural organic vegetable fiber which is in abundant supply.

Another object is to reduce the effects of water absorption of such products, as pressed boards, without the necessity of special additives, which products will substantially retain their strength after a 24 hour water soak.

One of the features of the inventive manufacturing method attributed to one aspect of this invention is a fiber preparation technique which results in a semifinished state of fiber development in the primary refining before digester pulping, as equal to refine-ground wood pulps.

An important feature of the invention resides in the preparation of the dry stock, such as woodchip stock, involving the forcing of liquids into the micro-structure of the cellulose stock in a pre-hydration compression step prior to pulp forming. While the preferred liquid to be used is water, other liquids such as methyl ethyl ketone, benzene, toluene, ammonia and xylene may be used. For the sake of simplicity, the use of water, the preferred liquid, will be illustrated. After this step the fibers are subjected to a rapid liquid or vapor phase cooking under a moderate pressure of about 130 to 650 p.s.i. Such rapid pre-hydration results in quick plasticizing and equilibrium moisture content increase from 6–12% to 30–55%. The process attains a loosening of the microstructure of the wood without causing a burning of the microstructure as it is common in known process using high steam pressures to "explode" the microstructure of the chip stock resulting in browned, burned fibers and also in a loss of chemical thereof causing a dark, burned appearance of the finished product, or as in other methods, using long cycles or chemical cooking with or without extensive vacuum washing of stock intended to remove the lignins from the fiber.

In accordance with another aspect of the invention, lignins, which in the known processes are an object to be eliminated from the pulp, are specifically retained by the inventive process, and under controlled steam pressure and heat conditions are caused to be softened during the above-mentioned pre-hydration digester steps and thereafter surround the individual fibers. In a further step, when the products are permanently fused together or polymerized, the natural phenyl-lignin liquids resolidify and are utilized by the inventive process as a permanently reacted lignocellulose thermosetting plastic binder for the composite structure.

In accordance with still a further aspect of the invention, manufacturing of pressed boards from woodchips, such as from waste oak and other hardwoods, is provided through a high consistency wet process employing methods of lignin bonding of the fibrous mass to produce a range of densities and thicknesses heretofore unavailable without added binders. Thicknesses between 0.01 and 6 inches may be produced with densities between 22 and 80 lbs. per cu. ft.

The present process differs from the previously described prior art methods in a number of ways. Chips or particles of wood or vegetable fibers are soaked and drained (except as noted hereinafter in regard to "green" chips) and fractured and crushed under rapid impact or compression causing permanent structural changes in the cellulose. The cellular structure is collapsed and the microstructure of walls is fissured and partially ruptured by the compression force sufficient to force liquids into the cell walls including the lignin bearing portions of the compound middle lamellae for the purpose of: (1) rapidly softening or plasticizing the lignins with water; (2) opening the internal structure and exposing it to later attack by liquids or gases; (3) uniformly increasing the volume of internal water at or near maximum fiber saturation; (4) to reduce the time required to heat, cook, and separate the fibers under subsequent mechanical treatment and/or steam pressure, by providing quick access to the interior microfibrillar walls and lignin-bearing structural system, as for example found in woody stems. This rapid impact or compression force should be in the order of 500 p.s.i. to 10,000 p.s.i. and may be accomplished by feeding a mat of chips between rolls or like devices, or subjecting chips to a compression between an air hammer and a travelling metal belt, or a press, cam, or offset roll Alternately, the compressive force may be accomplished by use of fluids or gases. For example, the chips may be contained in a pressure vessel surrounded by a fluid or gas, such as water or air, and a rapid pressure increase is accomplished by means of a piston, pump, pressure tank, etc. It will be appreciated that the particular type of compression device is not critical and any device may be used as long as it produces a fast acting crushing force sufficient to collapse the microstructure of the soaked and drained chips and fibers. This fast acting force causes the free liquids of the cell lumen to be further forced into the walls, thus causing internal wall micro-failures due to the liquid travelling by compressive action and intensified by heat resulting from the sudden energy imparted to the mass from an outside source. In summary, the action is to soften, plasticize and render flexible, the fibers. It will also be appreciated that the present invention accomplishes the rupturing of the cells without loss of fiber lengths, since there is no cross cutting, as takes place in a screw compression or an explosion, as in the high pressure steam process, both of which result in a reduction of fiber length. In the present process, the chip retains this original size except for the massive internal fracturing from compression, without cross cutting. Along with the cell fracturing, there is a simultaneous combining of liquids and gases to also soften and expose the elementary wall structure through massive internal fracturing, and combining in the middle lamellae to destroy the mechanical and chemical bonds of natural polymer resin constituents, thereby providing access to these constituents for further process steps.

The next step in the system, which is, in general, partially a fractionating step, is for the purposes of (1) eliminating undesirable low temperature volatiles such as turpentines, vegetable oils, waxes and sugars, (2) continuing to soften and plasticize the natural resins and polyphenyl portions of lignin and to swell and soften the cellulosic microfibrillar strands for improved felting of web or mat formations. Accordingly, the pre-treated (having undergone rapid compression) chips, fibers, shavings or particles of wood or other vegetable, or lignin-bearing materials are subjected to rapid steam cooking, i.e., at pressures of 130 p.s.i. lbs. to 650 lbs. p.s.i. from ½ minute to 15 minutes or longer if desired, i.e., ½ to 2 hours, resulting in the forcing of large volumes of liquids and steam condensate further into the structure and thereby reacting quickly as a result of such pre-treatment and thereby causing a fractionating of the various components. The pH of 4.8–4.9 is usual for pine and oak. Some improvemena in the lignin softening may be accomplished during short cooking periods when the chips are permitted to become saturated with the cooking liquor. While liquor is discharged separately, the resulting cooked chips are rapidly agitated or passed through conventional attrition mills for final fiber separation and fiber finish at 1–10% consistency with water. The highly cross-linked polymers are softened, retained and ready for secondary reactions under final heat, pressure and cooling.

The addition of chemicals to further soften the lignins, as used in mild kraft or sodium sulphate or sulphite cooking, is not required, but would be optional.

Prepared pulps are blended to suit the final product characteristics as to density, etc. The stock is shaped in a forming box, mat molding machines, extruders, continuous wire formers, fourdriniers, verta formers or any web formers, or any known forming devices designed to remove the water from fibers, i.e., as by vacuum and/or pressure combinations, or dried fibers may be shaped in any of the known devices with heat provided as desired, either with wet or dry fibers. The thickness of any mat, web or similar shaped product will depend upon consideration of the final product thickness desired and may range from .010" to 6", thereby yielding products suitable for many applications.

In the curing of mats, webs, sheets or boards made from the prepared fibers, particles, chips or shavings, the internally retained, but softened plastic resin polymers dispersed therein are released and made immediately available without further blending or treating as they flow out under heat and pressure. The poly-phenyl resins coat the fibers, stiffen the matrix and form a crystalline binder of a water repellent, permanently fused thermosetting substance, enclosing or encasing a fibrous web of pure cellulose strands and bundles normally cross-linked by hydrogen bonding and further mechanically interlocked. A portion of such fibrous materials, having converted to gel constituents and combined with such lignins in and about the mass, also provides a further permanent gap-filling-sealer for larger particles and fibers. Final curing of pulps, prepared and controlled retained polymer resins for secondary reactive curing of shaped products, as particle-boards, where the binder is internally generated, may also be suitable for papers, paperboards, fiberboards, or molded products. The stages of secondary reaction are based upon fiber formations which are cured under pressures of 100 to 500 p.s.i. for products of 22 to 80 lbs. per cu. ft. density (although pressures up to 1500 p.s.i. may be used) and further subjected to elevated temperatures up to 640° F. for limited exposures carefully controlled to avoid deterioration of structural strength.

During the final curing stage an effective second order transition takes place wherein the basis cellulose strands and natural resins are re-cast in a multiple, highly cross-linked fusion bonded, irreversible, permanently reacted ligno-cellulose mass or shape.

For example, at 400° F. in hot plate pressing, the cycle after reaching 300° F. should be sufficient to assure adequate resin flow-out. The rate of resin flow-out is controllable in relation to the dwell time under pressure and heat. Based upon ½″ thickness at 50 lbs. per cu. ft. and at a temperature of 350° F. to 400° F. the cycle is about 18 to 60 minutes. Based upon ¼″ thickness at 60 lbs. per cu. ft. and at 350° F.–400° F., the cycle is about 10 to 35 minutes. Such cycles are adequate to reach sufficient flow-out to produce particleboards which will pass the UM–32–FHA test for Exterior Mat Formed Particleboards and generally meet all standard strength requirements. The heating may be accomplished di-electrically, or in part di-electrically. For combined di-electric and conventional heating, rates of temperature rise up to 150° F. per second, in presence of high ambient conditions, are obtainable. Cycle time, after reaching about 50% solids, may be reduced by the use of radio frequency (R.F.) heating to assist in water removal, and the maximum temperature may be reached very quickly. When using a maximum temperature of 640° F., exposures at this temperature are limited to less than 10 seconds. In consideration of the heat of mass and increased rate of B.t.u. acceptance at higher internal temperatures, as accomplished in high voltage di-electric heating on ½″ boards, the rate of rise was measured by wax temperature sensitive indicators, and any residual increases in temperature beyond shut-down of the heating source requires anticipation. Even without the application of pressure, significant further contraction or shrinkage does not take place, but a hardness increase is apparent.

An important aspect of the R.F. curing process is the creation of the noted temperatures internal of the pulp material under treatment, and to further effect and maintain outside (as opposed to internal) temperatures in the immediate work vicinity of about 215° F. or greater, thus minimizing losses to the atmosphere of the dielectric heat applied for short periods in final plasticizing of cellulose and lignin poly-phenyls and other moldable materials. R.F. energy is absorbed more rapidly and, therefore, less expensively when applied in the presence of elevated temperature levels of 215° F. and above. Such outside temperatures, as described above, permit an increase rate of feed of sheets, boards and molded products.

Pulps prepared for reactive forming and curing may be dried or partially dried to a 6–5% equilibrium moisture content, and then sheeted, fluffed and stored or baled or otherwise packaged for shipment for use in moldable or shaped materials as described above. The reactive pulps, when formed as either wet or dry-felted mats or formed into shapes under mechanical pressure up to 1500 p.s.i. but normally under 500 p.s.i. and elevated temperatures up to about 640° F., as described above, may be made into papers, particleboards, hardboards, paperboards, molded products, extrusions, pellets, or cores, and especially wet-strength unbleached paper products, such as kraft paper, liners, corrugating sheets and laminating paper, or other papers, to replace products usually made with synthetic resin saturated papers. Especially notable are products of the high density structural boards which show properties for exterior use.

Boards may be produced on continuous wire forms. After being layed down on the wire forms, the pulps are pre-pressed for water removal and thickness control. The so-formed pulps are then cured in a single or multi-opening mechanical press with plates heated to 500° F. and up to 640° F., especially with the use of R.F. heating. Time to cure the boards in the press is about 2–20 minutes. Dried ligno-cellulose shapes previously formed at lower temperatures of up to 500° F. may be reformed into permanent shapes by effecting a second order transition reaction of the ligno-cellulose matrix at temperatures of 575°–640° F. Partially dried, fluff dried, or semi-dry, ligno-cellulose fiber pulps of 75 to up to almost 100% solids may be shaped into mats, webs or other configurations and cured under heat and pressure of from about 330° F. up to 640° F. At the lower temperatures, extended times of heat and pressure may be used, but at the higher temperatures, a sharply reduced time of heat and pressure is necessary. The temperature ranges suitable for effecting the second order transition reaction and full plasticizing of ligno-cellulose is between about 575 to 640° F. It should be well noted, however, that no specific pressure is necessarily applied to shapes previously consolidated and formed at lower temperature ranges of up to 500° F. or slightly higher. The pressure primarily functions on such formed shapes to hold the formed and consolidated shape in the desired configuration during reaction and cooling.

The addition of catalysts to effect more rapid or complete, cross-linked reactions under acid curing conditions may be used. Formaldehyde or other hardeners, or plasticizers may also readily be incorporated in the pulp, prior to final shaping.

Water repellents and surface treatments may also be combined readily to such systems if they are chemically compatible with the polar nature and electro-chemical characteristics of the fibers. Depending upon the final product characteristics desired, alum and fiber surface reactants may be blended in combination with additives, such as water repellents, wood preservatives, fire retardants and insecticides.

The present inventive method is especially suited to kiln-dried waste wood, where cell structures show crystallinity, contraction failures and structural collapse of some portions, which are normally unsuitable for conventional pulping processes. The present process reactivates the resinous portions, eliminates curl in dried fibers, swells the structure and converts the material into a shapable wood pulp.

Thick walled hardwoods, as in oak, are also acceptable in this process, either green or dry. Cooperage wastes show satisfactory results in conversion to products, especially when blended with softwood.

Other objects and advantages of the invention will become more readily apparent from the following detailed description thereof, shown by way of example in the accompanying drawings in which.

Figure 1:
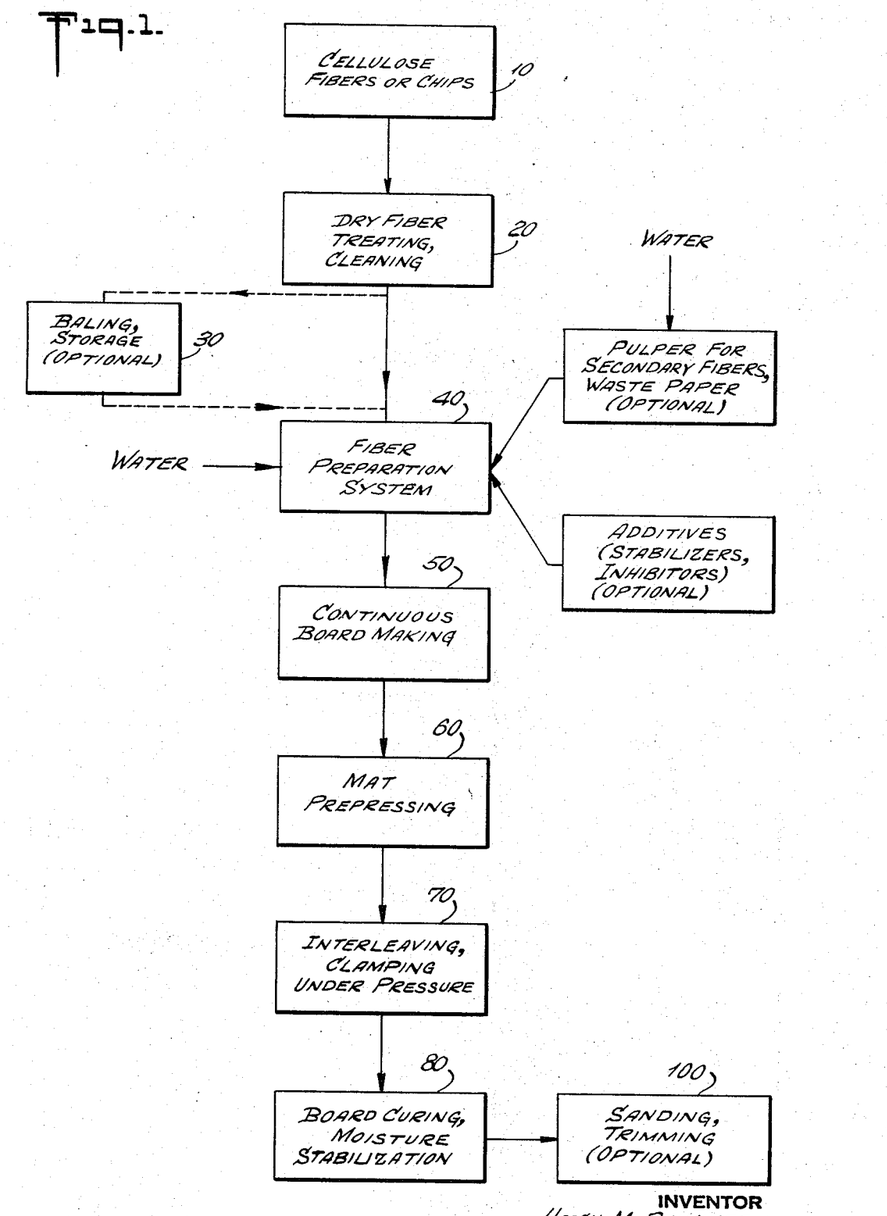
FIG. 1 is a block diagram showing the steps of the process in accordance with the invention.

Referring to FIG. 1, the cellulose fibers or chips are schematically indicated at 10; these fibers may be relatively friable, dry or "green," loose or baled.

At stage 20, the dry raw stock is treated, wherein any small or large portion of trash, pith, bark, leaf and foreign matter such as sand, stone, metal, etc. is removed through mechanical separation employing centrifugal, gravity, attrition, flailing, magnetic or air-separation machinery.

The inventive process finds an advantageous application in the utilization of oak, mixed hardwoods, and/or dry or green softwoods. Oak chips are difficult to control in finished products, as the species is dense, subject to decay and discoloration, sometimes curled and friable, showing excessive swelling and shrinking. These properties are often inferior to other species of wood. Tannic acid staining in oak is another disadvantage.

It has previously not been feasible to employ dry oak wood chips in major proportions in the preparation of pressed boards because of the deficiencies noted above. The process in accordance with the invention corrects such deficiencies observed in short fiber hardwood material, such as oak, and renders them suitable for processing to pulp, thereby creating a hitherto non-existent utility for waste kiln-dried oak chips and similar hardwood waste material previously burned as fuel.

At 30, baling and storage have been indicated which, however, are optional steps and may be bypassed, as shown by the solid flow line. The dry stocks, such as chips indicated at 10, which are normally obtainable from cooperage wastes, flooring wastes, planer mill shavings and furniture waste, etc. are of random size. The dry prepared stock, coming either from stage 20 or from storage 30, is therefore subjected to screening such as vibrating screening through small diameter holes, as indicated at 40, to eliminate "fines" and dust passing, for example, a #20 mesh, since particularly hardwoods and oaks are not acceptable for pulps in the form of dust or fines.

Following screening, the remaining chips and shives, fiber bundles and particles are soaked, as indicated at 41, in water at room temperature or at temperatures ranging to about 212° F. for a period of at least one hour, in order to partially swell and minimize the production of "fines" in the subsequent processing operation. It should be noted that longer soaking time, such as two hours or more, is preferable. It is also within the scope of the invention that steaming may be substituted for soaking to achieve swelling of the stock. However, it is to be noted that "green" chips, having a moisture content of at least 30% and up to 50%, may not require the soaking step.

Figure 2:
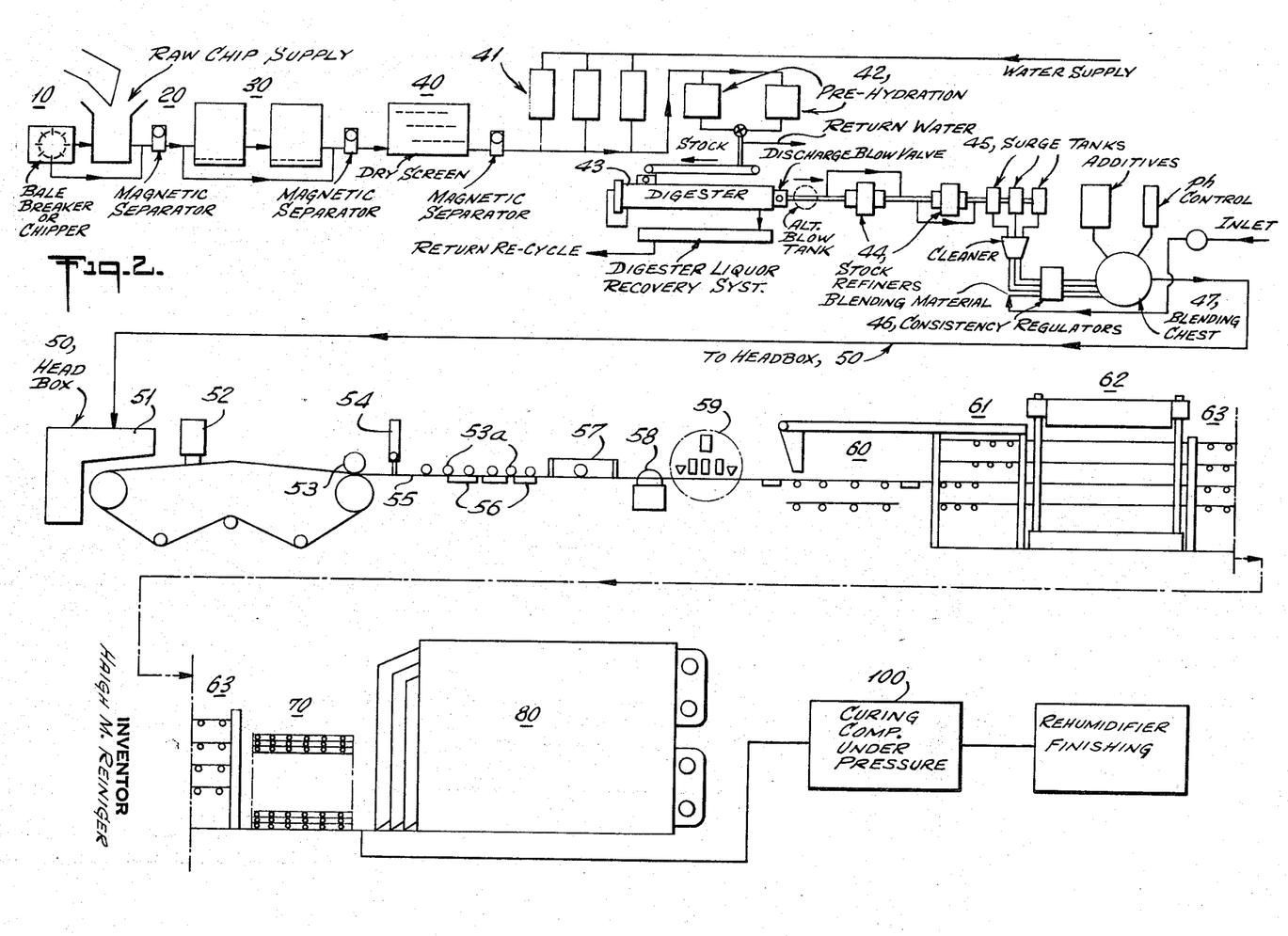
FIG. 2 is a schematic showing in greater detail of the inventive process shown in FIG. 1.

The chip stock is then drained of excess water and fed, as a further step within stage 40 (FIG. 1), into direct power compression mechanism 42 (FIG. 2). The pressure applied should be between 500 to 10,000 p.s.i. The importance of such forced power prehydration of the microstructure becomes apparent from the conditions required by the next step following the microstructures compression treatment, wherein the chemical elements of the middle lamella are largely exposed and a high equilibrium moisture content is present. The compression mechanism is shown as a roll type, and may be a single unit as shown or cascaded, and the roll nips are adapted to be set for predetermined openings. As an example, the nip of the rolls may be set for pine and oak chips at 0.005 to 0.20 inch with a pressure of 1000 lbs. to 10,000 lbs. per linear inch of nip. The chips are uniformly fed into the nips of the machine and after having passed through the rolls, become softened, tenderized, and show massive cleavage and fracturing of fiber bundles in a longitudinal direction. The r.p.m.'s of the rolls are related to the rate of feed and opening of the nip and, typically, the speed will be about 100 to 150 r.p.m.'s. The compression rolls may be knurled, but preferably are provided with a smooth surface since knurling may result in excessive cross-grain crushing as opposed to the effect obtained with smooth rolls. The rolls preferably are notched in order to permit forcing of excessively large chips through the nips. Single or multiple-pass treatments are possible. The chips are nearly completely devoid of curling, splitting or breaking across the grain through radial and tangential compression forces.

Figure 6:
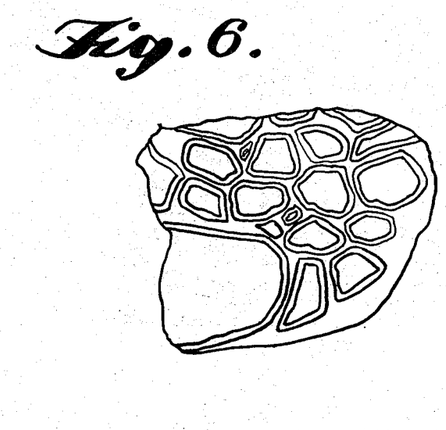
FIGS. 6 and 7 show a cell before and after being processed.

As shown in greater detail in FIG. 6, a screen or shaker-type screen 101 passes the chips to a soaking container 102. A conveyor 103 moves the soaked and drained chips to a hopper 104, from where they fall onto a forming belt 105. The matted material is passed through the nip formed between rolls 106 and 107. Roll 106 is adjusted by micro-set devices 108 to provide a proper clearance. The crushed stock is then fed by screw 109 into digester 110. Of course, if desired, the compression device or means may be located inside the digester and the chips are compressed immediately upon entering the digester or at sometime prior to cooking.

Such prehydration of the structure by mechanical compression permits rapid superheating with minimum cell structure collapse, thus permitting the lignins of the compound middle lamella to easily flow during the subsequent cooking phase with minimum gas miniscus holdout and massive exposure of cementing constituents in the cell structure.

Figure 7:
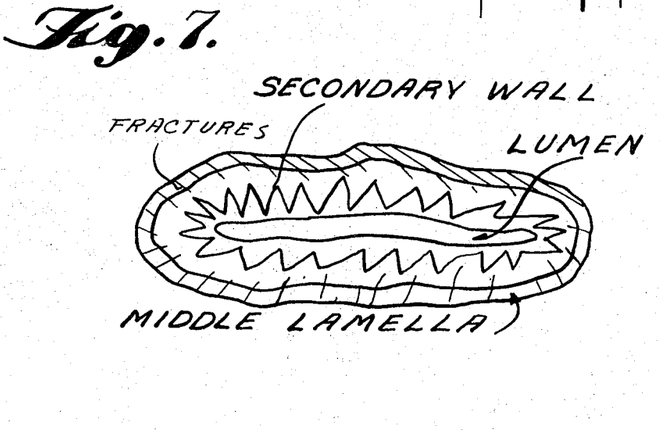

FIG. 7 shows a typical cellulose structure prior to the compression of the present invention. FIG. 8 shows one of the cells after compression.

The crushed chip stock then undergoes a rapid cooking. A rapid cooking is possible as a result of the new state of the pretreated microstructure obtained in the prior compression treatment thereof in obtaining effective moisture control and distribution of liquid in the structure. The cooking, either liquid-phase or in steam, is carried out under a steam pressure of between 130 to 650 p.s.i., i.e. from 140 to 200 p.s.i., for a period of 1 to 15 minutes, i.e. 4 minutes, or longer if desired. The present rapid cooking under the controlled temperature, time and pressure conditions attains a further loosening of the microstructure of the stock without causing burning of the fibers or natural lignins as is common in known processes using higher pressures to "explode" the microstructure. Steam pressures, in any case, at substantially above 140 p.s.i., result in simple burning of dry nonpre-hydrated chips. The digester apparatus can be of the continuous or batch type, vertical or horizontal. Particular improvement is observed when liquors are not permitted to drain away during any part of the cycle and then discharge blow valve of the apparatus is disposed on the bottom portion of the vertical digester. The improvements were especially pronounced in relation to the color of the stock, which became unusually bright. Further improvements were noticed in the fiber formation, particularly with respect to the length and development of the obtained fibers.

It is an important feature of the present rapid cooking that lignins, which are normally removed as unwanted substances, are not removed but retained in the pulp. In accordance with the present invention, during the rapid cooking, the lignins will soften or plasticize and are lost in the cooking liquor only in minute amounts so that the stock leaving the digester apparatus will retain 85–95% of all the natural lignins therein.

It becomes apparent that the water forced into the microstructure during the pre-hydration step also retains the free water of the cell lumen and this water is converted to steam and even superheated steam during the heating operation. This water is in close contact with the inner cell wall and adjacent to the compound middle lamella where large quantities of lignin polymer are normally held. The cellular structure thereby becomes sensitive and quickly reactive to high temperature.

The pre-hydration of the structure permits lignins to plasticize almost instantly after the digester reaches steam pressures and temperatures of 130 to 200 p.s.i. and about 350° F., respectively.

The stock is next subjected to a mechanical refining process as indicated at 44, at 2 to 25%, i.e. 2 to 15%, consistency, to effect defibering, fibrillation and separation of the large fiber bundles. This mechanical refining step may use apparatus comprising standard disc or conical type refiners which are operatively associated with the discharge blow valve or a blow tank connected to the discharge side of the digester apparatus.

The stock is then regulated to have between 2 and 25% consistency at surge tanks 45 or at regulators 46, at which point the consistency is sufficient for forming, molding or storage for later use. The pulp obtained in the inventive process may retain its highly reactive chemical characteristics, in view of the plasticized natural lignins, for a sustained period of time.

Wet reactive pulps were found to have the following Bauer-McNett characteristics:

PULP FROM SOUTHERN PINE CHIPS—DRY WASTE

Contents after pre-hydration—57% water+43% solids
Time in digester cooking—5 minutes
Pressure of steam in digester—145 p.s.i.

Screen tests 20 mesh retained 43.4%
35 mesh retained 21.5%
65 mesh retained 12.2%
150 mesh retained 3.6%
150 mesh passed 19.3%

PULP FROM TENNESSEE WHITE OAK CHIPS—DRY WASTE

Contents after pre-hydration—50% water+50% solids
Time in digester cooking—10 minutes
Pressure of steam in digester—145 p.s.i.

Screen tests 20 mesh retained 28.0%
35 mesh retained 34.7%
65 mesh retained 10.9%
150 mesh retained 4.1%
150 mesh passed 22.3%

As a last step of the fiber preparation stage 40 (FIG. 1), the pulped stock may be subjected to blending, as shown at 47, to the final fiber content and especially when the pulped chip stock is oak. In such cases, raw materials such as pine, hemlock, spruce, or comparable long fiber species may be used so that the final blend will typically show Bauer-McNett wet pulp fiber classification of about 22.3%, passing through 150 mesh. At this point other so-called beater additives, binders, fillers, hardeners or plasticizers may also be added to the blender.

Upon completion of the pulp preparation stage, the stock enters a shaping device such as a mat forming device, which may be performed in a continuous mat forming apparatus during stage 50. Such apparatus include a head box former 51 wherein the head box itself is of an open head box type.

The wet laps partially formed in the head box are introduced onto an endless screen belt 55 having a roll pre-press apparatus 53 cooperating therewith where the first continuous sheet formation takes place. Thickness gauges, apparatus 54, may be employed for controlling both wet mat and following pre-pressing process.

While the mat is still on the endless belt 55 at the discharge of the head box, preferably intermediate the pre-pressing rolls 53 and the head box 51, a secondary head box 52 may be arranged for introducing facing surface pulps on the basic mat formed in the head box 51. Such facing material may be of a different specie or color, and may have characteristics which improve the outside surface of the finished board, i.e. pine face on oak core.

It is noted that the invention provides production of a multi-ply board in a continuous process by the provision of separate head boxes arranged to supply their respective pulp on the forming belt in a predetermined order, or in a composite multi-compartment head box.

The mat or wet laps, upon having passed the pre-pressing stage, may comprise additional overhead pressers 53a cooperating with suction boxes 56 to provide a predetermined consistency and moisture content of about 50–65% at a certain sheet thickness. The mat is then introduced into a cutting apparatus which comprises a cross-cut flying slitter 57 as a first stage and a longitudinal slitter 58 as a second stage. The stock emerging behind the longitudinal slitter is substantially hard and cut to a desired size.

Upon having been pre-cut, the panels enter a stacking apparatus 60, which transfers the panels into conveyor-elevator feeder 61 of a hydraulic continuous pre-press 62, which applies pressures of up to 1,000 p.s.i. (but normally pressures less than 500 p.s.i. are sufficient and between 150 and 500 p.s.i. is the preferred range). The pressure applied is dependent upon the thickness and density of the desired board. The pre-pressing improves product stability, assists in distribution of natural binders, establishes the lines of formation cleavage, establishes contact within the fibermatrix operation and also prevents permanent distortions which would result from swelling, shrinking and fiber movement caused by later stress induced forces. Removal of excess moisture leaves 25–40% moisture content in the panels after pre-pressing. Other results obtained by pre-pressing are the decreased thickness of the uncured panels and better stiffness, allowing for better handling of the panels in the subsequent steps in the board manufacturing process.

Following the pre-pressing operation, the panels are stacked at 70 in stacks of up to 200 units having interleaving ventilating cauls between the mats for allowing multi-directional gas, chemicals, heat and cooling flow between the faces of each mat and through the stack during the curing stage. The same cauls may also serve as R.F. electrodes for reaching higher or maximum (640° F.) temperature range thereby appreciably decreasing the overall cycle time to 2–10 minutes after reaching 300° F. internal temperatures.

FIGS. 4a–4d show different embodiments of spacing cauls, such cauls being disposed between each panel. The cauls are designed to permit multi-directional flow of heated air through the stacks and permit the escape of moisture, vapor and free water. The cauls also transfer and retain the pressure on the surfaces of the mats during the curing process.

Figure 4A:
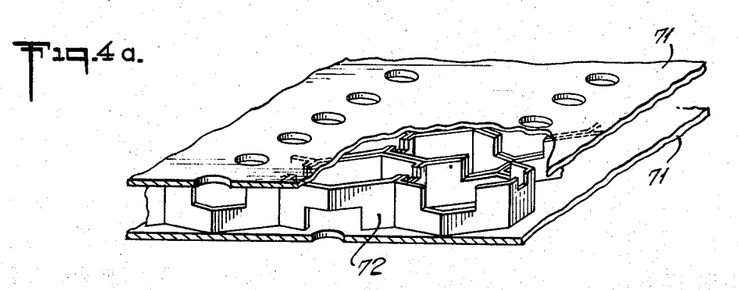
FIGS. 4a–4d are cross-sectional views of the caul plates, in accordance with the invention.
Figure 4B:
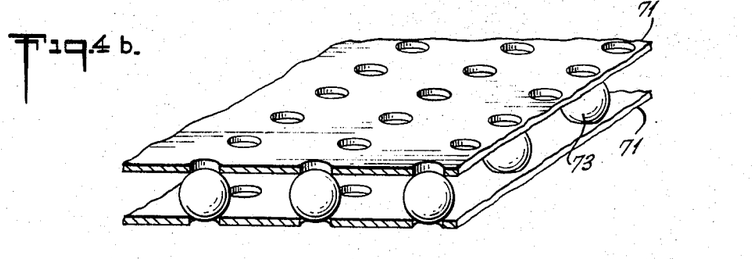
Figure 4C:
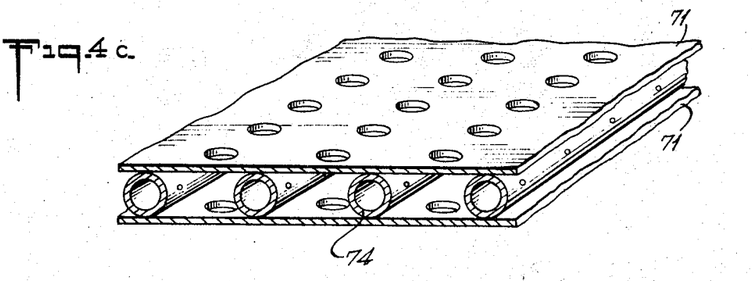
Figure 4D:
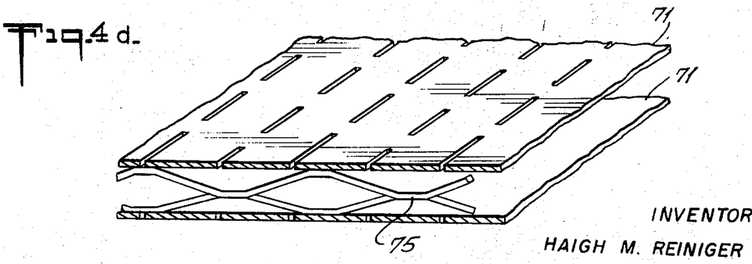
Figure 5:
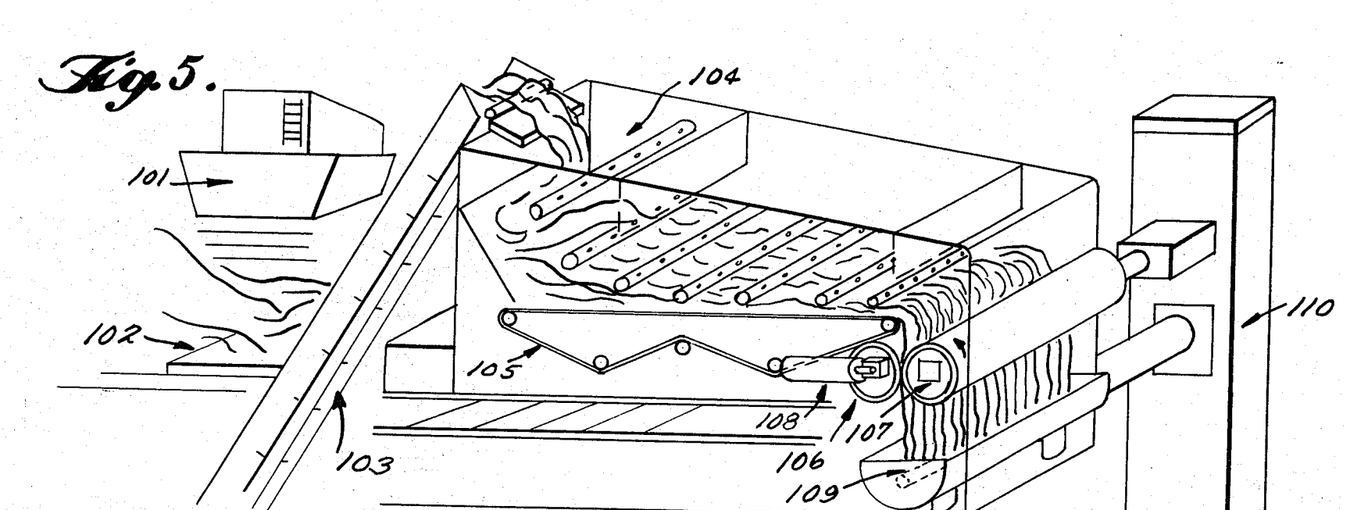
FIG. 5 is a particularly useful embodiment of the process.

The cauls, as shown in FIG. 4a partly in section, may be provided with a honeycomb core between the face plates 71, while FIG. 4b shows a caul having spacing balls 73 disposed between the face plates 71. The caul of FIG. 5c employs tube spacers 74, while the core of the embodiment of FIG. 4d is formed from a metal wire or expanded metal, as designated at 75, capable of withstanding the pressure in the curing press without a change of distance between the face plates. At least one of the face plates 71 of the cauls in each of the illustrated embodiments is preferably provided with punched or drilled perforations or by slits, as in FIG. 4d, to permit escape of gases from the panel adjoining such face plate. The perforated or drilled face plate may be provided with a wire mesh coating on at least one side to further ventilate and also in order to prevent escape of the stock should the perforations be large enough in some requirements. The structure of the cauls, in accordance with the invention, permits multi-directional flow of heat and gases to and from the panels during the curing stage and allows curing and pressing of the panels in stacks consisting of up to 200 panels, and thereby qualitatively and quantatively an improved curing stage is attained.

The panels stacked in units up to 200, depending on the size of the particular panels, with interleaving ventilating cauls therebetween, are next transferred for final curing under pressure as indicated at 80. For this purpose preferably a single-opening press, shown in FIGS. 4a and 4b, is adapted to accomplish all stages of the curing cycle.

The single-opening press 80, shown in FIGS. 4a and 4b, is preferably a hydraulically operated unit. The press may be operated by automatic controls from a press controller station to which the conditions prevailing at different curing stages may be monitored. An operator in response to the monitored conditions may effect adjustments in the internal operating conditions of the press compartment. Curing of the panels in the press is performed by the use of steam, chemical gases, liquid chemicals, hot air and/or dielectric heat with any of these. For conveying the particular curing fuel to the internal portions of the press, a duct system 83 is provided.

Figures 3A, 3B:
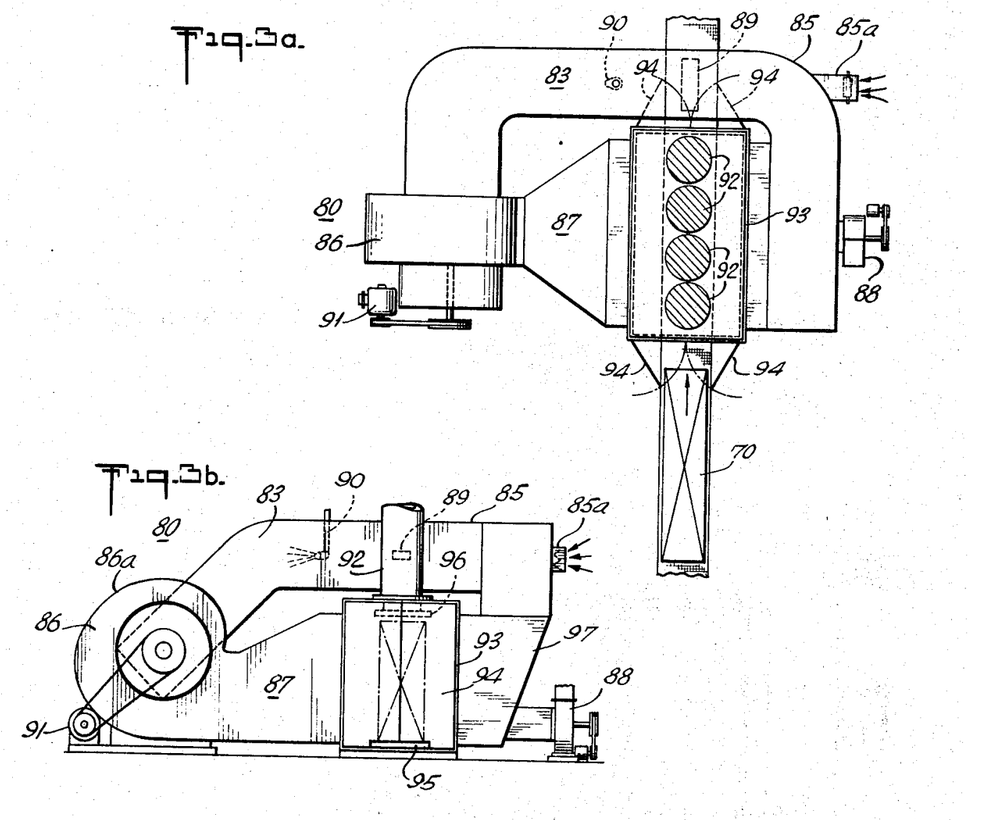
FIG. 3a is a schematic view of the curing press in plan view, in accordance with the invention.
FIG. 3b is a schematic view of the curing press in accordance with FIG. 4a, in side elevation.
Figure 3C:
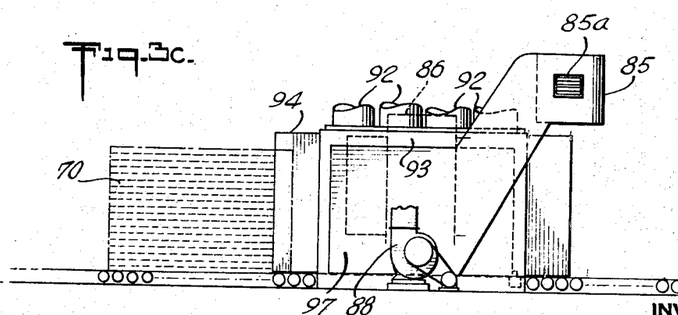
FIG. 3c is an end view of the press.

With particular reference to FIGS. 3a and 3b, it is seen that manifold system 83 includes an intake duct 85 having a fresh air inlet 85a. Intake duct 85 is provided with a burner 89, preferably of the gas type, capable of supplying, in the illustrated embodiment, 4.4 million B.t.u./hr. The heated air is further modified by the controlled addition of steam from a nozzle 90, such as to achieve a predetermined humidity control of the air steam past the nozzle 90. The motivating force for the system 83 includes a fan 86 which in the illustrated embodiment is rated at 117,000 cu. ft. per minute and is disposed in a housing 86a.

Fan 86 is driven by motor 91. The outlet of fan 86 terminates into a funnel portion 87 of the manifold, the funnel portion being of the size to convey the air to the oven portion 93 of the press substantially at its full width and full height.

The press is preferably of the hydraulic down-acting type in which the top platen 96 is actuated by a plurality of pistons 92.

The panels 70, stacked with interleaving cauls therebetween, are disposed on an endless conveyor 82 which before each curing cycle transports the particular stack into the internal space of the press through entrance doors 94. Conveyor 82 is moving transversely with respect to duct portions 83 and 97.

The press exerts through top platen 96, cooperating with a bottom platen 95, a constant pressure on the stack at different stages of the curing as hereinafter described.

Panels entering the press are still in a so-called wet phase and will be subjected to a pressure of about 150–175 p.s.i. for about 10–15 minutes under temperature conditions, controlled through the manifold 83, constantly increasing from about 70° F. to about 100° F. Then the temperature will be increased at a steep rate of change to about 210° F. which will be maintained for 30–40 minutes. The latter stage is the so-called steam or water phase. During the next 10 to 15 minutes the internal temperature of the mat is increased to about 350° F. while, at the same time, the pressure is brought up in the neighborhood of 250–500 p.s.i. Under the latter conditions, the panels are in the so-called dry or lignin phase, being held at a constant temperature and pressure up to 90 minutes. Upon expiration of the last-mentioned time-period, the panels are promptly cooled to about 70°–90° F. and the pressure is released.

Upon completion of the curing cycle in the press, automatic discharge doors 98 of the press open and the endless conveyor 82 removes the cured stack of panels at the other side of the press while, concurrently, another stack, prepared at the entry side of the press, enters the press through the automatically opening doors. Doors on both sides open and close upon actuation of stop means 84 by the leaving cured stack.

A manifold portion 97 is connected to the side of the press opposite to funnel portion 87 to exhaust the fuel gases upon completion of the curing cycle, by an exhaust fan 88 having a capacity of 10,000 cu. ft./min. in the illustrated embodiment.

During the curing cycle, the fuel gases flowing in the manifold 83 are constantly analyzed for temperature, B.t.u. content, water content, residual chemical recovery, etc.

It is understood that the number of panels to be stacked for curing varies in accordance with the thickness of the panels and the particular thickness of the interleaving cauls used. The opening of the press is also adjustable within wide limits so that operation for a wide range of panels at maximum efficiency is attainable.

After leaving the curing press, the panels are transferred into a storage space having general humidity control associated therewith and rehumidified to maintain a final moisture content of 6–10%.

As an alternative for the single opening press, the stacked panels may be transferred to a curing compartment and maintained under pressure in a locking frame while in the compartment. Inexpensive cold holding presses may also be employed to maintain constant pressure on the stack. The panels are interleaved, as pointed out above, with the ventilating caul system for controlled heat entry and escape of gases during the full curing cycle, which may last up to eight hours. Pressures ranging between 100 and 500 lbs. per square inch, temperatures ranging between 100°–500° F. and an average time of 145 minutes have been used to obtain products having an average thickness of one-half inch at 50 lbs./cu./ft. The edges of the interleaving cauls are sealed or open and provide heat supply and discharge, including hot air under pressure, to the upper and lower panel surfaces. Access of the heat to panel surfaces is achieved through multi-opening and multi-directional slits, in honeycomb type cores and through perforations in the punched metal cores between the top and bottom perforated plates and screens at the mat face, similarly as above described in connection with the curing step in the atmospress.

Thus, hot air, entering under controlled pressure, and at optimum curing conditions, gains access to the surfaces under treatment and simultaneously permits the escape of gases, free water and steam. The interleaved edges are optionally sealed with gaskets and duct rubber, plastic or metal tubing, or may be left open to allow the air to circulate through the system.

The pressure is then released from the system and the panels are transferred to the humidity controlled storage as above.

As a further alternative pressing method, solid steel or non-metallic platens or rolls of the known single or multiopening type, while operationally serving simultaneously also as R.F. electrode elements through heat and pressure stages, may be employed in standard mechanical or hydraulic press operations using pressures to 1500 p.s.i. to produce any flat or formed shape as described herein, or in a two stage system wherein platen or roll temperatures are between 300 and 500° F. and a separate but final pass is given each board or shape at temperatures up to 640° F. with or without pressure but usually with dielectric, gas infrared or any combination thereof also present.

At a later stage the panel boards may be subjected to finishing operations, such as, sanding, sizing, or trimming, according to the desired final appearance. If desired, surface treatments including the formation or irregular shapes may be incorporated through the introduction of dies as part of the press platen or interleaving caul system. Molding dies or secondary clamping dies may be employed during the curing cycle to treat the surface of the board to produce any desired decorative effect. Textiles, metals or plastics may also be introduced for surfacing purposes, reinforcements, or architectural design.

Fiberboards, made under the process described herein, survived 6-cycle accelerated weathering conditions as prescribed by FHA–UM–32, for exterior particleboards after soaking in water 24 hrs. Workability is excellent and fastening with screws, nails, staples, and standard fasteners is excellent. Boards stabilized at about 6 to 10% moisture content (O.D. basis) exhibit outstanding properties of uniformity throughout, stability and quality, and are free of abrasive wear and stresses imposed by the resin glue migration of dry-process products.

Tests carried out by Timber Engineering Co. (TECO) with a set of samples of the novel untreated pressed boards gave the following average characteristics.

|  | Test range | Wood particle-board commercial std. CS-236-61 | Board Identification No. | | | |
| --- | --- | --- | --- | --- | --- | --- |
|  |  |  | P3B-1 [1] | P3A-1 [2] | P4-1 [3] | P6A-1 [4] |
| Modulus of rupture in lbs. per sq. in | 1,285-3,318 | 1,600 | 2,875 | 3,104 | 2,725 | 1,845 |
| Modulus of elasticity in lbs. per sq. in | 258-568 | 250 | 505,000 | 498,000 | 442,000 | 376,000 |
| Internal bond (surface lift) in lbs. per sq. in | 59-129 | 60 | 76 | 82 | 120 | N.A. |
| Ball hardness | 1,940-3,060 | [5] | 2,410 | 2,800 | 2,600 | 2,230 |
| Density in lbs. per cu. ft | 54-68 | [6] | 67 | 65 | 64 | 58 |
| Screw holding and stability test (#10 sheet metal screw) when applied to the surface: lbs | 220-322 | 225 | 300 | 322 | 286 | 220 |
| Lateral nail pull in lbs. (exterior) |  | 70-90 | 149 | 194 | 300 | 332 |
| ¼" from edges | 132-380 |  |  |  |  |  |
| ½" from edges | 194-628 | 150-200 | 202 | 246 | 332 | 534 |
| Linear expansion, percent | 0.16-0.37 | [7] 0.50 | 0.31 | 0.36 | 0.28 | 0.30 |
| Linear expansion, MC range percent |  |  | (6-14.8) | (6.2-15.7) | (5.7-14.2) | (5.7-12.8) |

[1] P3B-1: 50% oak, 50% pine blend; ¼" thick.
[2] P3A-1: 100% pine; ¼" thick.
[3] P4-1: 50% oak, 50% pine blend; ⅜" thick.
[4] P6A-1: oak layer sandwiched between 100% pine layers; ½".
[5] No specification.
[6] Per manufacturer.
[7] Maximum.

It is seen that a process has been provided by the invention, according to one aspect of which, an improved reactive pulp is produced, making use of natural electro-chemical and mechanical properties of the natural phenyls and other lignins contained in the phenyl-lignin system of the primary wood stock. Retention and release of such effective natural plastic binders in the ligno-cellulose became possible by the rapid-cycle digester cooking at low pressures and relatively low temperature fractionating, which heretofore was not possible, because applicant's inventive direct power massive fissuring of the fiber while plasticizing the retained lignins in the presence of water was not available.

The invention has provided, as one of its aspects, a mechanical compression-hydration step, which attains a forcing of water into the innermost portions of the microstructure along with loosening and fracturing of the microstructure accompanied by massive cleavage of the fibers in the longitudinal direction, whereby a rapid cycle, subsequent digester cooking becomes possible at moderate temperatures, accompanied by further softening of the lignins at these temperatures. The system avoids long exposure of the fibers to high steam pressures and temperatures in digester cooking, contrary to the practice of known processes which, in order to plasticize lignins must resort to extreme pressures and temperatures or in combination with heavy mechanical attrition often with the result of severe damage to the natural chemical binders and to the fiber itself.

In contrast to known processes, the invention provides pulps in rapid cycle cooking at lower or moderate temperatures to give a higher yield at the lowest cost.

The reactive pulp, in accordance with another aspect of applicant's invention, provides basis for the production of natural phenyl-lignin bonded composite or multiply boards of varying thicknesses ranging from 1/16" to 2" and densities from 20 lbs./ft.³ to 80 lbs./ft.³. Curing of such boards is performed in applicant's inventive curing stage which is inseparably connected with the properties of the phenyl-lignin reactive pulp.

Applicant's reactive phenyl-lignin pulp is also suited for the production of reactive papers for high temperature and high pressure calendering, laminating or platen pressing as a core or foundation for coated stock, or in saturating cardboard, where the natural polymers may be incorporated into the saturating system, or for papers where hardness or wet strength are primary factors; for use as molding pulps for containers, tubes, products, as well as structural flat or molded shapes, where polymer resin systems will be compatible with the natural bonding characteristics of the inventive reactive pulp, and thereby consolidate to effect better quality at lower cost; for long fiber high test and high strength papers, using blends of compatible fiber lengths in a reactive combination.

As a surfacing material retaining its integral polymer reactive component, pulps may, for example, be coated or layered directly onto the surface of natural wood or other cellulosic materials as in chipboards and plywoods, to give a new smooth surfacing. Such application may be a part of plywood curing. During the pressing cycle, both pressure and heat requirements will be obtained directly from hot platens of a plywood press of smooth surface or cauls, which are, in turn, in direct contact with the source of heat and pressure, the lignin bonding being the primary source of the internally secreting polymer for the system, while the addition of special purpose binders, hardeners, catalysts, plasticizers or formaldehyde solutions is possible in accordance with the electro-chemical requirements. Applications will have use for hard surfaced, smooth plywood for concrete form work, ping-pong tables, pool tables, kitchen cabinets and doors for same, countertops and table tops, transport liners, exterior sidings, and other hard surfaced uses; for large structural molded shapes such as radio and TV cabinets, molded household objects, including molded louver-type panels, flush doors either extruded or compression molded with solid or hallow cores formed internally; for the production of large panels molded to architectural configuration such as suitable for roofing panels having the die compressed or extruded to the shape of shingled roofing sections from permanently set and polymerized reactive pulp of the basic phenyl-lignin pulp; for exterior sidings, lap siding, flush doors or similar shapes molded or extruded from applicants reactive pulp; for marine hulls, topsides, small boats or other molded sections for transport and communications; for replacing present plastic laminates and other higher cost materials, or for combination with such plastics wherein reactive pulp product serves as a primary form, core, or the basic structure.

It is to be further understood that the reactive pulp and shapes of the invention may also contain other ingredients known to the art for such like products as desired, such as extenders, dyes and pigments, blowing agents when a foamed product is desired, and etc. Particularly important is the use of inorganic and organic and inert constituents, fillers and the like, especially for making shapes used in the building and furniture trades. A wide variety of fillers and inert constituents may be used and almost any proportion to reactive pulp is acceptable. However, generally up to 90% fillers and inert constituents may be used, and more desirably from 10% to 65% of fillers and inert constituents may be used. Examples of suitable fillers, and inert constituents are gypsum, asbestos, plaster, clay, asphalt, glass, thermoplastics, starch, proteins, bark, shell and wood flour, portland cement, metal particles, paper, carbon black, and various minerals.

While the foregoing disclosure describes in detail the preferred embodiments of the inventive products and processes, it is intended that the invention include all changes and modifications falling within the spirit and scope of the appended claims.

What is claimed is:

1. The process of making pulps for papers and paper board and the like from lignocellulose containing materials including the steps of passing said materials in the presence of moisture between mechanical compression rolls exterting a pressure of 1,000 lbs. to 1,000 lbs. per lineal iinch of nip for forcing liquids into the microstructure of said materials and causing massive internal fracturing of the microstructure, while avoiding cross cutting or breaks of the cellulose fibers, introducing said materials after passing between the compression rolls into digester cooking apparatus for cooking under steam pressure of between 130 and 650 p.s.i. for about ½ to 15 minutes such that no more than 15% of the natural lignins in the lignocellulose materials are lost, and refining the stock product to effect fiber separation to make said pulps.

2. The process of claim 1 wherein the said pulps after separation of the fibers are partially dried to 6–5% equilibrium content and then are dry felted for forming products.

3. A process for manufacturing products from lignocellulose containing materials including the steps of subjecting the materials in the presence of water to compressive forces from 500 to 10,000 p.s.i. using at least one mechanical compression roll to force water into the microstructure of the lignocellulose materials to cause massive internal longitudinal fracturing while avoiding cross cutting or breaks of the cellulose fibers, introducing the materials after being subjected to the compressive forces into a digester cooking apparatus for rapid cooking under steam pressure of between 130 and 650 p.s.i. for about ½ to 15 minutes such that no more than 15% of the natural lignins in the lignocellulose materials are lost, refining the stock product to effect fiber separation, thereafter forming a mat using said cooked materials of such sufficient thickness to make the desired product, subjecting said mat to a first pressing so as to reduce the thickness and facilitate its entry into the press, subjecting said mat to a second pressing to reduce the moisture content and applying heat and R.F. heating to the pressed mat with elements which are vented to permit the escape of moisture and gases to cure said mat by increasing the temperature rapidly to about 210° F. and sustaining said temperature for a period, then increasing the temperature of the mat to about 330° F. to 640° F. and sustaining the pressure and temperature conditions while fusion bonding the products.

4. The process of claim 1 wherein the said materials contain between 10% and 65% bark.

5. A process for manufacturing permanently reacted lignocellulose boards from cellulosic materials in a decreased time cycle comprising the steps of prehydration of the materials by applying crushing forces in the order of 500 p.s.i. to 10,000 p.s.i. to the materials, in order to force moisture present into the microstructure of the materials to cause massive internal fracturing while avoiding cross-cutting or breaks of the cellulosic fibers, steam cooking of the crushed materials for ½ minute to 15 minutes with steam supplied at 130 p.s.i. to 650 p.s.i. to soften said materials, refining said softened materials to effect fiber separation, forming said crushed, softened and refined materials into mats having a board configuration with a thickness greater than the thickness of the final board to be made, said formed material having moisture present up to 50%, subjecting said mats to a pre-pressing to reduce the thickness and curing said formed material by heat and R.F. dielectric heating while further pressing against at least one porous element for heating said formed material to a temperature above 330 degrees F., providing for the escape of moisture and gases from said formed material during the application of said heat and R.F. dielectric heating, raising the temperature of said material to not more than 640 degrees F. for fusion bonding the cellulosic materials to make boards from said mats.

6. The process as claimed in claim 5, in which said further pressing is at a pressure of not less than 250 p.s.i. and the temperature is raised above 350° F.

7. A process for making board products from cellulosic materials including the steps of passing the cellulosic materials in the presence of moisture through compression roll action producing a pressure from 500 to 10,000 p.s.i. to force moisture into the microstructure of the cellulosic materials and to cause massive internal longitudinal fracturing of the cellulosic fibers, steam cooking the materials under steam pressure supplied at 130 to 650 p.s.i. for ½ to 15 minutes, refining the stock product to effect fiber separation, pre-pressing the cellulosic materials for forming mats thereof, introducing the formed mats of cellulosic materials containing moisture between R.F. electrodes of which at least one is porous, providing elevated temperature of above 215 degrees F. in the immediate vicinity of said mats, applying R.F. dielectric heating energy to said mats and while maintaining said elevated temperature in the immediate vicinity thereof, providing for the escape of gases from said mats through said porous electrode while said R.F. dielectric heating energy is applied thereto, raising the internal temperature of said mats to a temperature above 330 degrees F. and below 640 degrees F., thereby providing board products in which a second order transition reaction causing irreversible fusion bonding of the cellulosic materials has occurred for providing board products suitable for interior and exterior use.

References Cited

UNITED STATES PATENTS

| | | | |
|---|---|---|---|
| 3,078,208 | 2/1963 | Cederquist et al. | 162—18 XR |
| 2,899,352 | 8/1959 | Young et al. | 162—225 XR |
| 2,996,422 | 8/1961 | Durant et al. | 162—237 XR |
| 3,227,606 | 1/1966 | Bidwell | 162—28 XR |
| 219,840 | 5/1943 | Basler | 162—28 |
| 3,098,785 | 7/1963 | Meiler | 162—56 XR |

S. LEON BASHORE, Primary Examiner

R. H. TUSHIN, Assistant Examiner

U.S. Cl. X.R.

162—18, 206, 225, 377